United States Patent [19]

Dailey

[11] 4,074,675

[45] Feb. 21, 1978

[54] COOKING DEVICE

[75] Inventor: Donald E. Dailey, Evansville, Ind.

[73] Assignee: Arkla Industries, Inc., Evansville, Ind.

[21] Appl. No.: 633,393

[22] Filed: Nov. 19, 1975

[51] Int. Cl.² ............................................. A47J 37/00
[52] U.S. Cl. ................................. 126/41 R; 126/25 R
[58] Field of Search .................. 126/41, 25, 25 A, 38, 126/9

[56] References Cited

U.S. PATENT DOCUMENTS

| 2,746,377 | 5/1956 | Parks | 126/25 X |
|---|---|---|---|
| 3,224,357 | 12/1965 | Rubens | 126/25 X |
| 3,638,635 | 2/1972 | Drehnan | 126/41 R |
| 3,938,493 | 2/1976 | Bauer | 126/41 R |
| 3,938,495 | 2/1976 | Bauer | 126/41 R |

Primary Examiner—Edward G. Favors
Attorney, Agent, or Firm—Cushman, Darby & Cushman

[57] ABSTRACT

A gas cooking grill comprises a casing which is generally L-shaped in side view, the casing enclosing a front horizontal cooking grid in the foot or front portion and a rear horizontal cooking grid at a higher elevation in the vertical or rear portion of the L. A gas burner and a bed of briquettes is disposed under the front grid. The front of the casing is formed by an upper door and a lower door each of which is hinged for swinging movement about a horizontal axis.

11 Claims, 4 Drawing Figures

U.S. Patent  Feb. 21, 1978  4,074,675
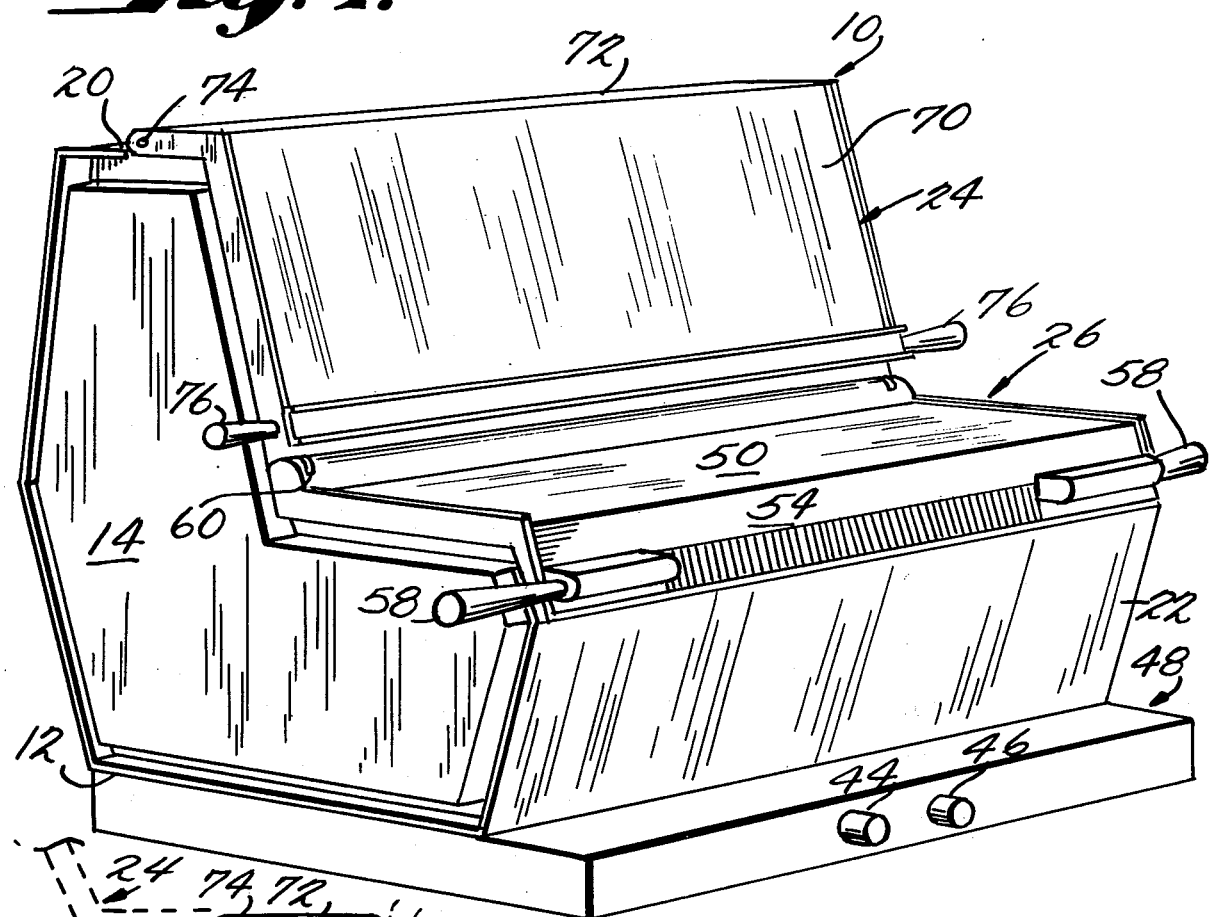
Fig. 1.
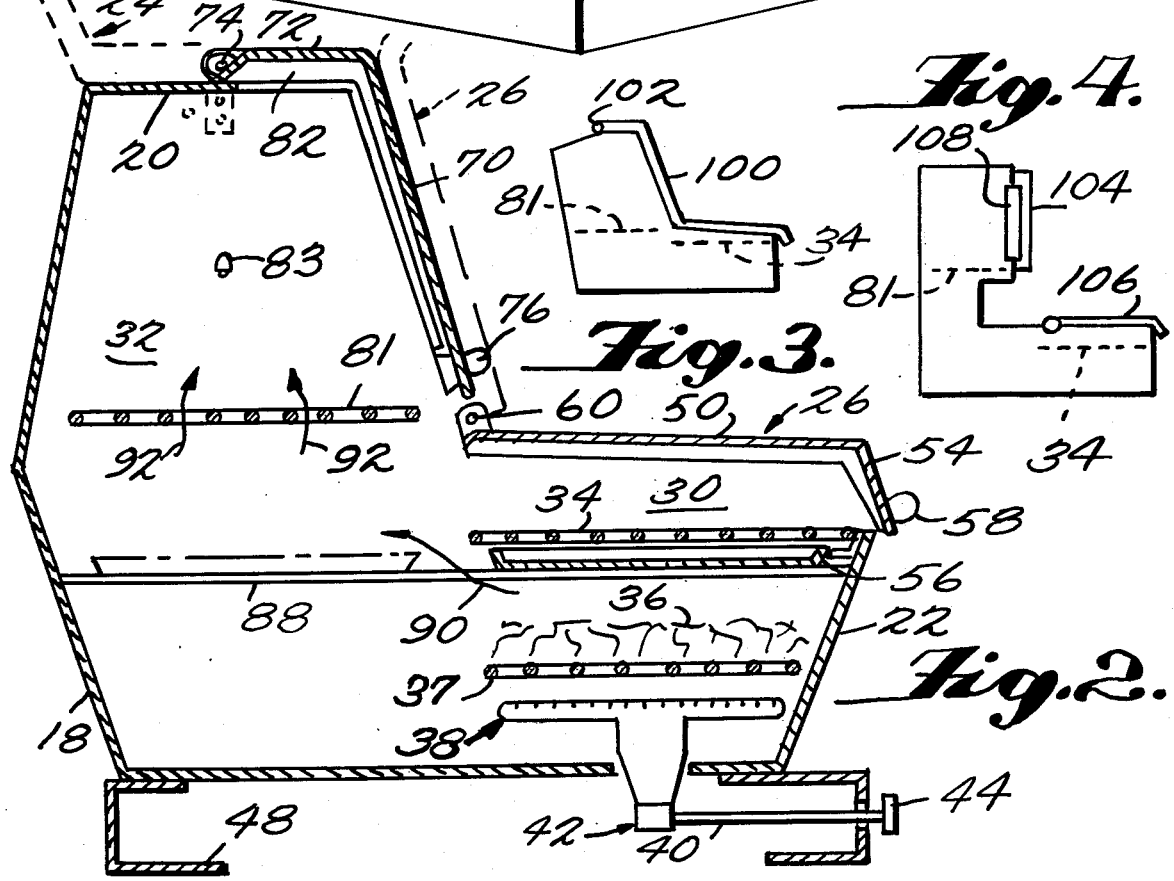
Fig. 2.
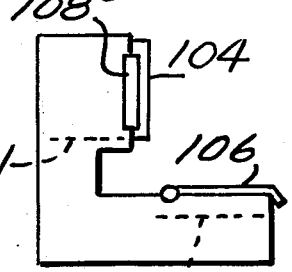
Fig. 3.
Fig. 4.

COOKING DEVICE

This invention relates to cooking grills of the kind in which food may be cooked either in a position directly above the heat source or in a position offset from the heat source. In particular it relates to a cooking grill of special configuration which provides advantages in terms of improved flexibility and efficiency of operation and ease of access to the cooking areas.

BACKGROUND OF THE INVENTION

Prior patents which disclose cooking apparatus in which heat from the heat source, such as charcoal, passes either directly upwardly to the food on a grid or laterally and then into contact with food on a grid include U.S. Pat. Nos. 2,851,941, 2,902,026, 2,909,170 and 3,447,360. This arrangement inherently permits different types of cooking. In one position the food receives intense direct heat which tends to barbecue the food in the sense that grease and fat drop into the heat source and become consumed and/or vaporzied. In the offset position the heat is less intense and tends to cook the food from all sides simultaneously.

BRIEF DESCRIPTION

The grill of the present invention includes a hollow casing which in side view is generally L-shaped so that the interior of the casing defines a lower box-like space at the front of the casing and an upper box-like space at the rear of the casing, the two spaces being in communication with each other. A horizontal front cooking grid is disposed in the front space directly over a heat source, and a horizontal rear cooking grid is disposed in the upper space at a location behind and above the front cooking grid. The rear, upper space and the lower front space are accessible from the front by means of at least one door which preferably is mounted for swinging movement about a horizontal axis so that it can be swung upwardly. In one preferred embodiment the upper front wall of the casing is hinged at its upper edge for such movement so as to expose only the rear space, and a lower door overlies the front grid and is hinged at it rear edge.

The front and rear spaces are arranged in the casing so that convection heat can pass upwardly through the front and rear cooking grids in sequence. This feature makes efficient use of the heat supplied to the device.

IN THE DRAWINGS

FIG. 1 is a perspective view of a cooking grill embodying the principles of the present invention;

FIG. 2 is a schematic vertical sectional view of the cooking grill of FIG. 1;

FIG. 3 is a schematic side elevation, on a reduced scale, of a second embodiment; and FIG. 4 is a schematic side elevation, on a reduced scale, of a third embodiment.

DETAILED DESCRIPTION OF THE DRAWINGS

Referring to the drawings there is shown a cooking grill having a casing 10 which encloses the heat source and food supporting elements. The casing 10 is generally L-shaped as viewed from the side and includes a bottom wall 12, side walls 14 and 16, a rear wall 18, a top wall 20 and a front wall 22. The front of the casing 10 above the front wall 22 is of stepped configuration and is formed of an upper access door 24 and a lower access door 26. The interior of the L-shaped casing has a lower front cooking space 30 corresponding to the foot portion of the L and a rear, upwardly extending cooking space 32 corresponding to the vertical portion of the L, these spaces 30 and 32 being in communication with each other.

Disposed in the front space 30 above the bottom wall 12 is a front food-supporting cooking grid 34 which extends from one side wall 14 to the other side wall 16 and from the front wall section 22 rearwardly to approximately the junction of the front space 30 with the rear vertical space 32. The grid 34 may be removably supported in any convenient manner as by means of horizontal flanges (not shown) projecting from the side walls 14 and 16. Below the grid 34 is a source of heat for the grill, the source being either electrical, gas or charcoal. In one preferred embodiment the source is a gas-source including a bed of ceramic briquettes 36 supported on a grid 37. As shown, the bed of briquettes 36 is coextensive with the front grid 34. Preferably, the gas-fired source of heat is adapted to heat the right side and the left side of the bed independently of each other or to heat both sides simultaneously. This may be accomplished by providing a gas burner 38 having at least two arms each of which is disposed under a different side of the grid 34, each arm having its own controllable gas supply. A suitable multi-armed burner together with the advantages of such an arrangement is disclosed in U.S. Pat. No. 3,638,635. Alternatively separate burners may be employed under each side of the grid 34. With either arrangement it is particularly convenient to deliver the gas supply through the bottom wall 12 of the casing 10 and to mount the gas control knobs 44, 46 in front of the casing 10, on the front of a hollow base 48, which supports the casing 10. Each control knob is mounted on one end of a shaft one of which is shown at 40, the shafts cooperating at their other ends with the burner valves 42.

The lower front door 26 includes a flat panel 50 which is disposed in a horizontal position when the door is closed. The panel 50 resides well above the grid 34 so as not to interfere with food placed thereon, and it will be noted that gases which pass through the grid 34 can then pass into the rear vertical cooking space 32 if the door 26 is closed. The door 26 includes a depending front flange portion 54 which overlies the upper edge of the wall 22 and includes two depending side flange portions 56 which overlie the corresponding upper edges of the side walls 14 and 16. It will be seen that the lower cooking grid 34 is disposed at a level below the upper edges of the side walls 14 and 16 so that the latter shield the grid 34 from lateral drafts when the door 26 is in a raised position. At the same time direct access to the grid 34 from the front is unobstructed since the grid 34 is disposed approximately at the level of the upper edge of the front wall 22.

The rear edge of the lower door 26 is hinged at 60 for swinging movement about a horizontal axis. In the full open position the door panel 50 has swung more than 90° from its horizontal position, and the door 26 will remain in this position until it is manually returned to its closed position. Suitable handles, such as shown at 58, are carried by the door 26.

The upper door 24 includes a flat front panel 70 which extends completely across the front of the casing 10 and a coextensive top panel 72 which overlies the top wall 20 of the casing 10. The rear edge of the top panel 72 is hinged at 74 to the top wall 20, and in the open position of the door 24 the panel 72 engages the top wall 20 thereby supporting the door 24 in that position. The door 24 includes side flanges 75 which overlie the corresponding edges of the side walls 14 and 16. Laterally projecting handles 76 are provided at the lower edge of the door 24.

A rear cooking grid 81 of approximately the same size as the front grid 34 extends across the entire horizontal cross-section of the cooking space 32 at about the level of the lower edge of the upper door 24. Conveniently the grid 81 may be supported on flanges (not shown) on the side walls 14 and 16. A spit 83 either stationary or power rotated may be provided in the space 32 by mounting the ends of the spit 83 on the side walls 14 and 16.

The upper cooking space 32 is vented through a slot 82 existing between the top wall 20 of the casing and the door panel 72, this slot 82 being open to the atmosphere at a location between the hinges 74.

If desired, an adjustable horizontal baffle 56 may be disposed at a level between the heat source and the front grid 34. As shown the baffle 56 is of approximately the same size as one of the grids 34 or 81 and is slidably supported on top of horizontal flanges 88 which project inwardly from the end walls 14 and 16. In the illustrated position the baffle 56 is disposed directly below the front grid 34 and in this position it aids in directing gases from the burner 38 rearwardly as shown by the arrows 90. The stack effect of the vertical cooking space 32 with the vent 82 near its upper end causes the gases to flow upwardly through the rear grid 81 as shown by the arrows 92. If the baffle 86 is moved rearwardly to the broken line position, the hot gases flow upwardly through the front grid 34 and then rearwardly to the rear grid 81 and the vent 82 if the front doors 26 and 28 are closed. If the door 26 is open most of the hot gases pass out of the casing at that location. If the baffle 56 is not present in either position the heat flow is still primarily through the space 30 to the space 32.

The baffle 86 may be pan-shaped to collect liquids from food on one of the grids 34 or 81 or to hold volatile flavoring components or water which can be vaporized during cooking. Alternatively the baffle 86 may be used as a griddle for frying when it is in its forward position and when the grid 34 has been removed.

The grill is adapted to a wide variety of cooking techniques. Assuming that the optional baffle 56 is not present the grill is capable of cooking food either on the front grid 34 with direct heat or on the rear grid 81 with indirect heat. Food placed on the front grid 34 is directly over the heat source. If the burner portion which is directly under the food is lighted, the food will be cooked in the usual barbecue style with juices and grease dropping into the heat source and being consumed and/or vaporized. The lower door 26 may be either open or closed. If open, some of the smoke and gases will normally pass into the atmosphere directly from the grid 34 while some will be drawn into the space 32 so as to pass through the vent 82. If the door 26 is closed, all of the smoke and gases will pass into the space 32, and an additional cooking effect will be obtained by reflection of radiant heat from the inner surface of the door panel 50.

The two portions of the burner 38 may, of course, be adjusted to different heat outputs. Alternatively only one burner portion may be lighted, and the food placed on that part of the grid 34 which is offset from the lighted burner portion. Under this condition the food will be cooked primarily by radiant heat from those briquettes which are directly under the food. The panel 50 may be used as a hot plate when the door 26 is closed.

Food placed on the rear grid 81 will be cooked by indirect heat in the form of hot gases passing into the space 32. The door 26 will normally be closed during this type of cooking so that the gases follow the path 90, 92. The hot gases will heat food on the grid 81 from all sides so that the cooking effect is similar to that in a roasting or baking oven. Any liquids which drip from the food will not come into contact with the heat source.

The relative disposition and size of the two cooking spaces 30 and 32 together with the configuration of the doors 24 and 26 is a very convenient and efficient arrangement in terms of accessibility to the cooking areas and flexibiltiy of operation. Each of the doors 24 and 26 raises to a position which gives full access to the respective grid 34 or 81 and in the open position the doors do not interfere with the placing, turning or basting of the food. The vertical dimension of the front space 30, that is the distance between the grid 34 and the door panel 50, is sufficient to receive pieces of food yet is relatively small so that the food can be cooked without heating a large vertical space. Larger pieces can be cooked on the rear grid 81 due to the larger vertical distance between the grid 81 and the top wall 20 of the casing 10. The space 32 will be heated to a lesser temperature than the space 30, so that once the burner 38 is lighted the grill provides two temperature zones. The operating temperature of each space 30, 32 is independently controllable, within limits, by opening or closing the doors 24 and 26.

The elevated position of the rear cooking space 32 together with the location of the vent 82 is conducive to the flow of gases through the space 32 without requiring any special baffles or pipes within the casing. This stack effect of the elevated space 32 and the elevated vent 82 is present even without the baffle 86, and the latter is therefore an optional feature with respect to the control of hot gas flow.

It will be appreciated that the spaces 30 and 32 are connected in series with the heat source, in the sense that most of the heat energy is applied to the front space 30 before reaching the rear space 32. This results in efficient use of the energy supplied by the heat source.

The embodiment illustrated in FIG. 3 includes all of the features discussed above except that the access means for the cooking grids is constructed as a single stepped door 100 hinged at its upper edge as at 102.

In the FIG. 4 embodiment the upper and lower doors 104, 106 are separate and the upper door is hinged at 108 for swinging movement about a vertical axis.

What is claimed is:

1. A cooking device comprising a hollow casing having top, bottom side, rear and front walls, said casing defining a first cooking space located in the lower front portion of the casing and defining a second cooking space disposed above and rearwardly of said first space and in communication with said front space, a front horizontal food-supporting structure disposed in said first space, a heat source disposed in said first cooking space directly below said front food-supporting structure and generally coextensive therewith, a rear horizontal food-supporting structure disposed in said second space at a location rearward and above said front structure, and door means forming at least a part of said front wall for providing access to said food-supporting structures, said door means when closed including a lower forward portion which directs the heat and hot gases flowing through said first cooking space into said second space, said forward portion overlying and at least substantially coextensive with said front food-supporting structure, said door means further including an upper portion disposed rearwardly of and above said lower portion and in a generally upright plane in front of said rear food-supporting structure, and means defining a hot gas outlet in said casing located above said rear food-supporting structure.

2. A cooking device as in claim 1 wherein each of said upper and lower portions of said door means is hinged to said casing for swinging movement about a horizontal axis.

3. A cooking device comprising: a casing having a bottom wall, a rear wall, side walls, a top wall and a stepped front wall, said stepped front wall including an upper access door having a main panel disposed in a generally upright position when closed, said door being pivoted for swinging movement about a horizontal axis disposed at the top of said door so as to provide access to a rear space in said casing, said front wall further including a lower access door having a main panel disposed in a generally horizontal position when closed and pivoted for swinging movement about a horizontal axis disposed adjacent the location of the lower edge of said upper door when the latter is in the closed position so as to provide access to a front space in said casing, said front and rear spaces being in communication with each other; a horizontal forward cooking grid disposed in said front space directly below said lower door so as to be accessible from above when said lower door is in a raised position; a horizontal rear cooking grid disposed rearwardly of the main panel of said upper door and in said rear space so as to be accessible from the front when said upper door is in a raised position; a heat source disposed in said forward space directly below said forward grid; and means defining a hot gas outlet in said casing located above said rear food-supporting structure.

4. A cooking device as in claim 3 wherein said heat source includes at least one gas burner and a bed or briquettes disposed above the burner.

5. A cooking device as in claim 4 including a hollow box-like base supporting said casing from below, said hollow base containing a gas control valve for said heat source and a control knob for said valve mounted on an exterior surface of said base.

6. A cooking device comprising: a casing having a vertically extending portion in communication with a horizontally extending portion and having generally the shape of an L when viewed from one side, whereby the foot of the L is said horizontally extending portion, the front of said casing having a lower access door disposed generally horizontally when closed and hinged for swinging movement about a horizontal axis extending generally along the junction of the foot of the L with the vertically extending portion of said casing, said casing having an upper access door disposed generally vertical when closed and hinged for swinging movement about a horizontal axis extending along the top of said vertical casing portion and parallel to the swinging axis of said lower access door; a front cooking grid disposed in said forward casing portion; a rear cooking grid disposed in said vertical casing portion; a heat source disposed below said forward cooking grill, and means defining a hot gas outlet in said casing located above said rear food-supporting structure.

7. A cooking device as in claim 6 wherein said upper access door when closed is slightly inclined toward the rear of the casing and wherein said lower access door when open engages said upper access door when closed and is supported in that position by said upper access door.

8. A cooking device comprising a hollow casing having top, bottom side, rear and front walls, said casing defining a first cooking space located in the lower front portion of the casing and defining a second cooking space disposed above and rearwardly of said first space and in communication with said front space, a front horizontal food-supporting structure disposed in said first space, a heat source disposed in said first cooking space directly below said front food-supporting structure and generally coextensive therewith, a rear horizontal food-supporting structure disposed in said second space at a location rearward and above said front structure, and door means in the form of a unitary structure having an upper edge hinged to said casing for swinging movement about a horizontal axis, said door means forming at least a part of said front wall for providing access to said food-supporting structures, said door means when closed including a lower forward portion which directs the heat flowing through said first cooking space into said second space, said forward portion overlying and at least substantially coextensive with said front food-supporting structure, said door means further including an upper portion disposed rearwardly of and above said lower portion and in a generally upright plane in front of said rear food-supporting structure.

9. A cooking device comprising a hollow casing having top, bottom side, rear and front walls, said casing defining a first cooking space located in the lower front portion of the casing and defining a second cooking space disposed above and rearwardly of said first space and in communication with said front space, said front wall including a stationary portion joined to said side walls and having an upper edge terminating below the adjacent upper edges of the side walls, a front horizontal food-supporting structure disposed in said first space at about the level of the upper edge of said stationary front wall portion whereby said walls shield said front food-supporting structure from lateral drafts a heat source disposed in said first cooking space directly below said front food-supporting structure and generally coextensive therewith, a rear horizontal food-supporting structure disposed in said second space at a location rearward and above said front structure, and door means forming at least a port of said front wall for providing access to said food-supporting structures, said door means when closed including a lower forward portion which directs the heat flowing through said first cooking space into said second space, said forward portion overlying and at least substantially coextensive with said front food-supporting structure and including a front depending flange which projects toward said upper edge of said front wall portion whereby when said door means is in an open position said front food-supporting structure is accessible from the front, said door means further including an upper portion disposed rearwardly of and above said lower portion and in a generally upright plane in front of said rear food-supporting structure.

10. A cooking device comprising: a casing having a vertically extending portion in communication with a horizontally extending portion and having generally the shape of an L when viewed from one side, whereby the foot of the L is said horizontally extending portion, the front of said casing having a lower access door disposed generally horizontally when closed and hinged for swinging movement about a horizontal axis extending generally along the junction of the foot of the L with the vertically extending portion of said casing, said casing having an upper access door disposed generally vertical when closed and hinged for swinging movement about a horizontal axis extending along the top of said vertical casing portion and parallel to the swinging axis of said lower access door, said casing including a top horizontal wall having a forward edge and said upper access door including a flange portion overlying and hinged to said edge of said top wall whereby when said upper access door is open said flange portion engages said top wall and supports said upper access door in the open position; a front cooking grid disposed in said forward casing portion; a rear cooking grid disposed in said vertical casing portion; and a heat source disposed below said forward cooking grill.

11. A cooking device comprising: a casing having a vertically extending portion in communication with a horizontally extending portion and having generally the shape of an L when viewed from one side, whereby the foot of the L is said horizontally extending portion, the front of said casing having a lower access door disposed generally horizontally when closed and hinged for swinging movement about a horizontal axis extending generally along the junction of the foot of the L with the vertically extending portion of said casing, said casing having an upper access door disposed generally vertical when closed and hinged for swinging movement about a horizontal axis extending along the top of said vertical casing portion and parallel to the swinging axis of said lower access door; a front cooking grid disposed in said forward casing portion; a rear cooking grid disposed in said vertical casing portion; and a heat source disposed below said forward cooking grill said casing including side walls and a front wall having a stationary portion joined to said side walls and having an upper edge terminating below the adjacent upper edges of the side walls, said front cooking grid being located at about the level of the upper edge of said stationary front wall portion whereby said side walls shield said front grid from lateral drafts, said lower access door including a front depending flange which projects toward the upper edge of said front wall whereby when said lower access door is open said forward grill is accessible from the front.

* * * * *